United States Patent
Niemoeller et al.

(10) Patent No.: US 9,491,244 B2
(45) Date of Patent: Nov. 8, 2016

(54) METHOD FOR INVOKING A CONSTITUENT SERVICE PROVIDED IN A TELECOMMUNICATION NETWORK AND AN APPLICATION SERVER FOR PROVIDING A COMPOSITE SERVICE

(75) Inventors: Joerg Niemoeller, Herzogenrath (DE); Eugen Freiter, Berlin (DE); Ioannis Fikouras, Stockholm (SE); Roman Levenshteyn, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1018 days.

(21) Appl. No.: 13/375,903

(22) PCT Filed: Jun. 5, 2009

(86) PCT No.: PCT/EP2009/056956
§ 371 (c)(1),
(2), (4) Date: Jan. 24, 2012

(87) PCT Pub. No.: WO2010/139368
PCT Pub. Date: Dec. 9, 2010

(65) Prior Publication Data
US 2012/0129557 A1 May 24, 2012

(51) Int. Cl.
*H04W 4/00* (2009.01)
*H04L 29/08* (2006.01)
*G06F 9/50* (2006.01)
*H04Q 3/00* (2006.01)
*H04L 29/06* (2006.01)

(52) U.S. Cl.
CPC ............ *H04L 67/16* (2013.01); *G06F 9/5038* (2013.01); *H04L 67/2838* (2013.01); *H04Q 3/0054* (2013.01); *H04L 65/1016* (2013.01); *H04L 65/1096* (2013.01); *H04L 65/80* (2013.01)

(58) Field of Classification Search
CPC .. H04L 63/0428; H04W 4/08; H04W 8/186; H04W 80/10
USPC ................................ 455/432.3, 435.3, 414.3
See application file for complete search history.

(56) References Cited

U.S. PATENT DOCUMENTS

2004/0060054 A1 3/2004 Das et al.
2008/0261593 A1* 10/2008 Wong et al. ............... 455/435.1

FOREIGN PATENT DOCUMENTS

EP 1978758 A1 10/2008

OTHER PUBLICATIONS

Heuvel Van Den, W. et al. "Service Representation, Discovery, and Composition for E-Marketplaces." Proceedings of the IFCIS International Conference on Cooperative Information Systems, Sep. 5, 2001, pp. 270-284.

* cited by examiner

Primary Examiner — Tu X Nguyen
(74) Attorney, Agent, or Firm — Coats & Bennett, PLLC

(57) ABSTRACT

A method is described for invoking a constituent service in a telecommunication network. The constituent service is associated to a composite service. A first group of parameters is determined which is associated with the composite service. A second group of parameters is determined which is associated with the constituent service. The first and the second group of parameters are compared. If there are matching parameters (212) in the first and the second group requirements are determined for the constituent service based on the matching parameters in the first and the second group. The constituent service (216) is invoked according to these requirements. An application server is also described.

19 Claims, 4 Drawing Sheets

METHOD FOR INVOKING A CONSTITUENT SERVICE PROVIDED IN A TELECOMMUNICATION NETWORK AND AN APPLICATION SERVER FOR PROVIDING A COMPOSITE SERVICE

TECHNICAL FIELD

The present invention relates to the field of service composition in a telecommunication network.

BACKGROUND

User demands become increasingly sophisticated, creating a constant need for deploying new services on service delivery platforms such as IMS. The IMS architecture enables innovative and differentiated person-to-person and person-to-content multimedia services in a standardized manner. For example, IMS enables users to add media and participants to an established communication session, to handle presence and group management, and to shift between different communication domains and communication sessions. In order to re-use existing services as far as possible, existing services can be aggregated to form a composite service satisfying particular user demands. The $3^{rd}$ Generation Partnership Project (3GPP) has proposed a Service Capability Interaction Manager (SCIM) that acts as a service broker in service interaction scenarios typically encountered in context with composite services.

Service composition refers to a technology, where end user services to be provided to user terminals, e.g. to personal computers, laptop computers, or mobile phones of a telecommunications network, are dynamically built by combining constituent services. Existing services which are aggregated to create a composite service are called constituent services in the concept of service composition. The selection of the constituent services as components of the composite service may be performed in real time when a user requests the composite service. The constituent services are described in terms of generic properties so that they can be selected based on these properties. Any service that provides the needed properties can be used as part of the composite service and consequently any suitable service within a pool of available services can be selected. The pool of available constituent services can change dynamically by adding new services or by removing existing ones. A composite service can therefore consist of different constituent services at each invocation. Thus, the set of constituent services that are actually included into a composite service is not necessarily static, but dependent on runtime conditions. The constituent services do not need to be specifically designed for service composition but they can also work as a single service.

Composite services address complex user requirements that can not be covered by standalone services. They can offer added value, e.g. in the form of new functionality, compared to the sum of the functionality of their building blocks. Constituent services to be used as part of a composite service are selected based on their descriptions. This description is denoted as the service model. The developer of a composite service specifies constraints which can determine which constituent services can be selected in the frame of the composite service. During execution of the composite service these constraints are evaluated by a composition entity and based on the service description a matching constituent service is selected to become part of the composite service.

An important parameter in service execution is the Quality of Service (QoS). QoS refers to properties of service execution that improve, for example, the user experience while using a service. The execution properties which are relevant for securing QoS depend on the type of service and therefore the provided functionality. For example, the experience of a user of a video streaming service depends on parameters like frame rate or frame drop rate or resolution of the video. On the other hand these properties are less relevant for a positioning service, where the latency until the result is delivered and the accuracy of the provided position might be the main quality factors.

A constituent service that performs a certain function and has certain properties may be used in different contexts. For example a service that provides the location of a mobile device might be used in order to check if a friend is in the same city or it might be used to get the user's own position in the context of a navigation application. In both cases the needed function is positioning. In the first case an accuracy of a few hundred meters is acceptable. Such accuracy might be enough in order to check if somebody is in a certain region or city, but it would be inappropriate for navigation purposes where an accuracy of a few meters is needed.

The above example shows that a constituent service may be selected based on the context of the general application but this may not be enough to secure the service functionality. There is therefore a need of appropriately selecting constituent services in the context of a composite service.

SUMMARY

It is an object of the present invention to obviate the above disadvantages and provide an advantageous method for invoking a constituent service provided in a telecommunication network.

A method for invoking a constituent service provided in a telecommunication network is proposed. The constituent service is associated to a composite service. A first group of parameters associated with the composite service is determined. Further a second group of parameters associated with the constituent service is also determined. After that the first and the second group of parameters are compared. In case there are matching parameters in the first and the second group, requirements are determined for the constituent service based on the matching parameters in the first and the second group. Finally the constituent service is invoked according to these requirements.

Furthermore, the invention can be embodied in an application server for providing a composite service in a telecommunication network. The application server comprises a processor which is adapted to determine a first group of parameters based on the composite service and a second group of parameters based on a constituent service. Further the application server comprises a comparator which is adapted to compare the first and the second group of parameters determined by the processor for identifying matching parameters between the two groups, if any. The matching parameters in the first and the second group determine requirements for the constituent service. The application server also comprises a selector which is adapted to invoke the constituent service from a service database according to the requirements.

The method can also be embodied in a program which is, for example, stored on a data carrier or loadable into a processing system of a device, e.g. as a sequence of signals.

The proposed method allows an advantageous invocation of a constituent service in service composition environment.

Further the application server allows an advantageous provision of a composite service in a telecommunication network.

The foregoing and other objects, features and advantages of the present invention will become more apparent in the following detailed description of embodiments as illustrated in the accompanying drawings.

DETAILED DESCRIPTION

Figure 1:
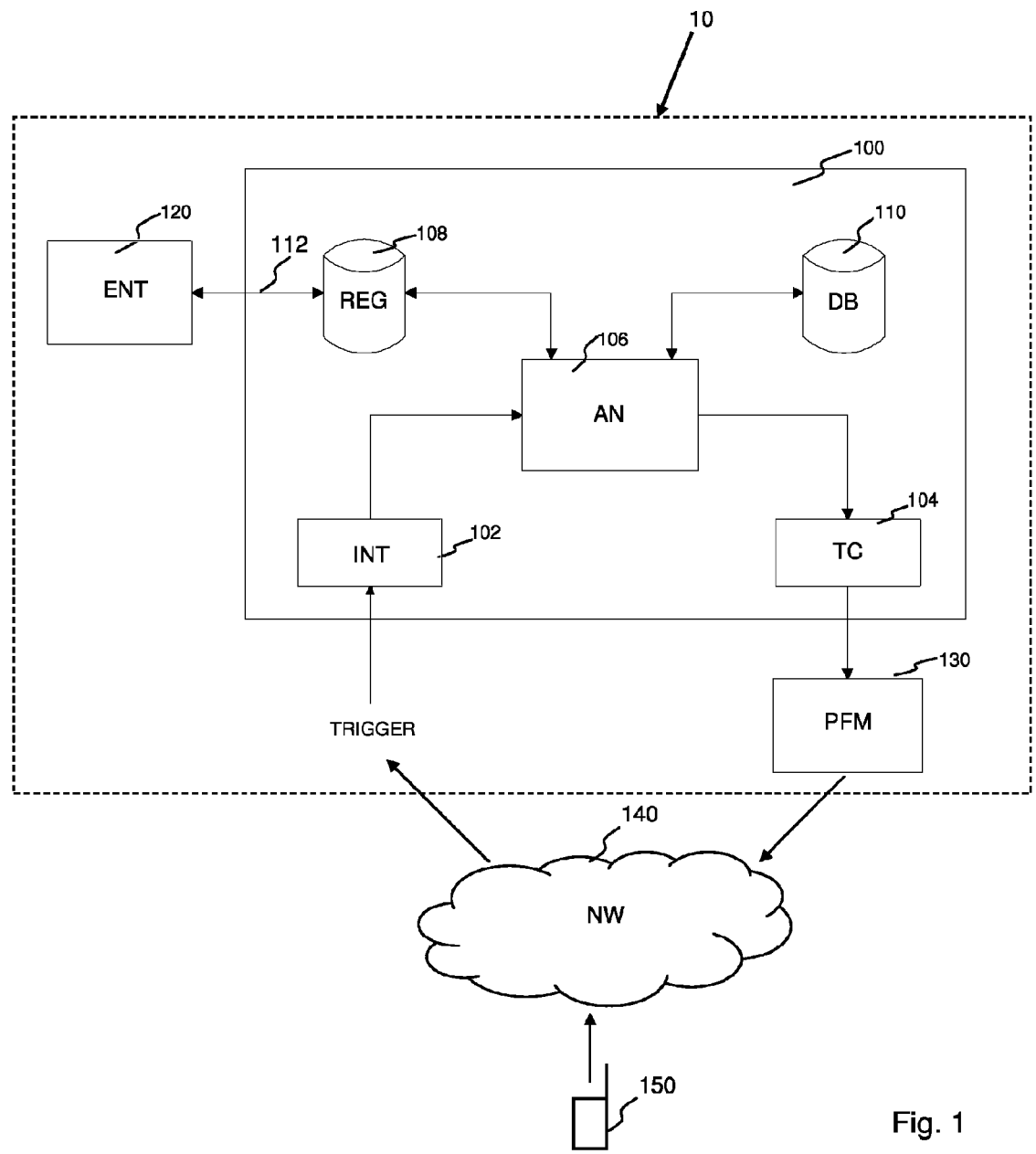
FIG. 1 shows an embodiment of a service composition engine.

FIG. 1 shows an embodiment of a service composition engine 10 in communication with a telecommunication network 140. The service composition engine will be described in order to provide an overview of the basic procedure for starting a composite service which comprises one or more constituent services. The engine 10 comprises an entity 100 for composing composite services and triggering their execution. The engine 10 further comprises an entity 120 for enabling the creation and/or modification of composite service skeletons. A service skeleton is a set of instructions that controls the selection of constituent services by specification of selection conditions. It can be used to define a composite service. The engine 10 further comprises a run-time platform 130 which can be used for executing composite services.

The entity 100 comprises an interface 102 that is adapted to receive a trigger event requesting an execution of a specific composite service. The composite service relates to at least one telecommunication session. The trigger event may be a message initiated by a user device 150 and this message can be transmitted to the interface 102 through telecommunication network 140.

The entity 100 further comprises a register 108 which includes at least one skeleton of the requested composite service. The skeleton can be provided to the register 108 by the entity 120 via a communication channel 112. An analyser 106 of the entity 100 is adapted to analyse the skeleton during the run-time of a composite service. The analyser 106 could be implemented as a parser or in any other manner.

The skeleton stored in the register 108 specifies a service pattern by logically linking a plurality of references to candidate services. In the case two or more candidate services are determined for a specific service reference a further selection process is required to finally determine the single candidate service that is to form a specific constituent service of the composite service. More than one skeleton may be stored in the register 108. If the register 108 includes a plurality of skeletons, each skeleton may be provided with an identifier that allows the analyser 106 to retrieve the appropriate skeleton.

By analysing the skeleton, the analyser 106 determines, based on the service pattern and the service references included in the skeleton, the constituent services that are to form the requested composite service. Additionally, the analyser 106 may determine an execution sequence for the constituent 10 services. In some cases, the process of determining the constituent services and the process of determining the execution sequence are not separate steps but are performed simultaneously. As a result, by e.g. repeatedly determining the next constituent service, the execution sequence of the constituent services can be determined automatically.

The entity 100 further includes a triggering component 104. The triggering component 104 is adapted to trigger execution of the constituent services determined by the analyser 106 in accordance with the execution workflow that has also been determined by the analyser 106. The execution of the individual constituent services that form the composite service may either be performed on the entity 100 itself, or, as illustrated in FIG. 1, on a run-time platform 130. In the latter case, the triggering component 104 is configured to communicate with the run-time platform 130 for triggering execution of the requested composite service based on the constituent services and the execution workflow determined by the analyser 106. The constituent services executed on the run-time platform 130 can be provided to the user device 150 over the telecommunication network 140.

The entity 100 may further comprise a database 110 including service descriptions for a plurality of services that have the potential of being selected as constituent services. The service references specified in the skeleton may thus refer to service descriptions stored in the database 110. By comparing the service references in the skeleton with the service descriptions of services stored in the database 110, the analyser 106 may determine one or more candidate services for each specific service reference. In the case two or more candidate services are determined for a specific service reference a further selection process is required to finally determine the single candidate service that is to form a specific constituent service of the composite service.

As mentioned in the background section it is important to secure the service functionality when a constituent service is invoked. Therefore a method is proposed which allows requirements related to the functionality of constituent services to be set when constituent services which are part of a composite service are invoked. These requirements are set on the invoked constituent services and relate to execution properties of the constituent services. Special reference will be made throughout the description of the proposed method on execution properties of constituent services which relate to the quality aspects of the constituent services. These quality aspects may relate to the perceived quality of service (QoS) of the user of the services. However the method can be applied to allow setting of other types of requirements relating to execution properties which are not necessarily relevant for quality aspects of the constituent services. Such a property can be, for example, the size of a program module to be executed during the service.

Figure 2:
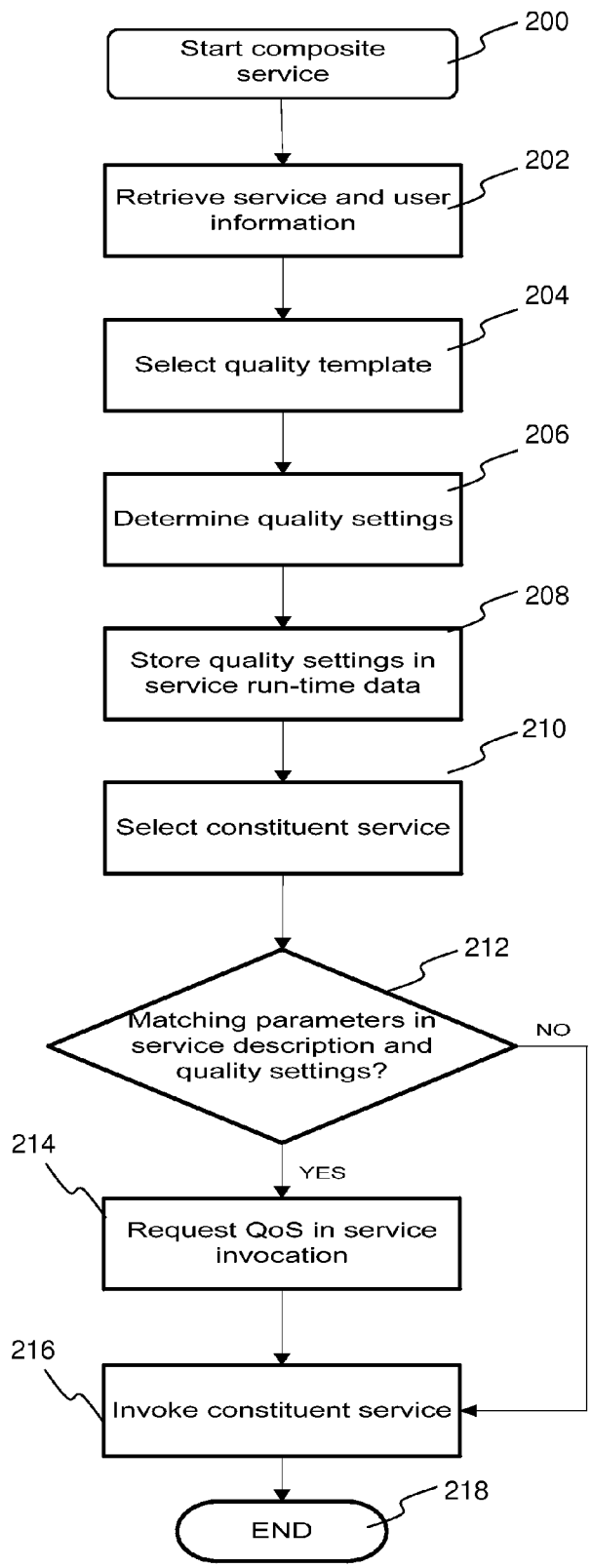
FIG. 2 shows a flow diagram of a method for invoking a constituent service.

FIG. 2 shows a flow diagram of the method for invoking a constituent service according to one embodiment. The constituent service can be associated to a composite service in the sense that the constituent service can be a candidate for being invoked during the composite service. The composite service may comprise a plurality of constituent services. Constituent services are invoked after the composite service has started. Such a composite service is started in step 200. In step 202, information about the composite service is retrieved. Further information about the user of the service can also be retrieved in step 202. Information about the composite service can be, for example, the type of the service e.g. a weather forecast service. User information can include details about the user's subscription. This information corresponds to the profile of the user and can be retrieved from a user database and is gathered in order to identify the initial parameters which are relevant for the user and the started composite service. For example a user with a premium subscription requesting a weather forecast may get a more precise forecast than a user with a normal subscription, e.g. a forecast of more than one day and/or for the specific city where he is located.

Further, in step 204, a quality template is selected, which can also be referred to as a service template or template. The selection of the template is made based on the information retrieved in step 202 about the composite service and the user. The selection can be further made based on the skeleton of the composite service. The template contains the parameters of the composite service which are relevant for the quality of this service and it may also contain values or value ranges of these parameters. Therefore these parameters can be called quality parameters. The template might be selected out of a database of pre-defined templates. Alternatively the template may be generated if no suitable template is found in the database. If this is the case then the template generation may be based on the information retrieved in step 202 about the user subscription and the started composite service.

In step 206, the quality settings for the composite service are determined. The quality settings are the collection of the quality parameters contained in the service template mentioned above and they are stored in the run-time data of the composite service session, in step 208. The run-time data of the composite service session may be e.g. parameters which are used during service execution. In step 210, a constituent service is selected for being part of the composite service. The selection is made based on constraints set by the composite service. These constraints are described in the skeleton of the composite service. If, for example, the composite service is, as mentioned before, a weather forecast service, one possible constraint could be that there needs to be a constituent service providing the location of the subscriber. The constituent service can be selected out of a service database which contains the descriptions of a plurality of services. These descriptions may also describe the quality parameters that the service would be able to handle. For example the description of a constituent service for positioning may state that the service can serve only requirements for accuracy while another service can serve requirements for accuracy and latency.

Following the selection of the constituent service, and before the service is invoked, a check for matching parameters is performed in step 212. Matching parameters are those which influence the same aspects during service execution, e.g. the response time of the service, and therefore matching parameters can be also considered as parameters of the same type. The quality settings stored in the run-time data of the composite service in step 208 are compared with quality parameters included, if any, in the description of the selected constituent service. If there are matching parameters between the quality settings and the quality parameters then, in step 214, QoS is requested as an additional property to be taken into account during the invocation of the constituent service. If there are no matching parameters between the quality settings and the quality parameters then, in step 216, the constituent service is invoked without QoS being requested. The method ends in step 218.

Invocation of a constituent service with QoS request means that, compared to service invocation without QoS request, additional quality parameters are added as input parameters in the constituent service invocation. These additional quality parameters are the matching parameters between the quality settings and the quality parameters included in the description of the selected constituent service. The input parameters can be considered as requirements which determine execution properties of the constituent service. The values that are chosen as requirements are taken from the quality parameters that are stored in the run-time data of the composite service session. Alternatively, the ability of a constituent service to fulfill a QoS request can be negotiated prior to invocation of the constituent service over e.g. a dedicated application program interface (API).

The check in step 212 can be performed before invoking a constituent service. Alternatively it can be performed only if there are quality parameters specified in the stored quality settings that are applicable for the selected type of constituent service. The comparison between the quality settings in the run-time data of the composite service and the quality parameters in the description of the selected constituent service may be used in order to influence the selection of the constituent service. The comparison may also be used as a method of selecting additional invocation parameters and possible the values of these parameters.

In an embodiment, constituent service selection can be influenced by taking quality parameters into account. As described above, if the selected constituent service does not have any quality parameters specified in its description, in step 216, QoS is not requested and the selected constituent service is invoked without QoS being requested.

In another embodiment, if, due to the nature of the composite service, QoS has to be ensured then additional selection constraints can be used in order to select only constituent services which have quality parameters specified in their service description.

Furthermore constituent service selection can be based on the quality template by implicit generation of additional service selection constraints. In this context, it may be useful to further extend the service description in order to not only describe the supported quality parameters, but also a value range for a given parameter, e.g. accuracy of 100 m-200 m.

Figure 3:
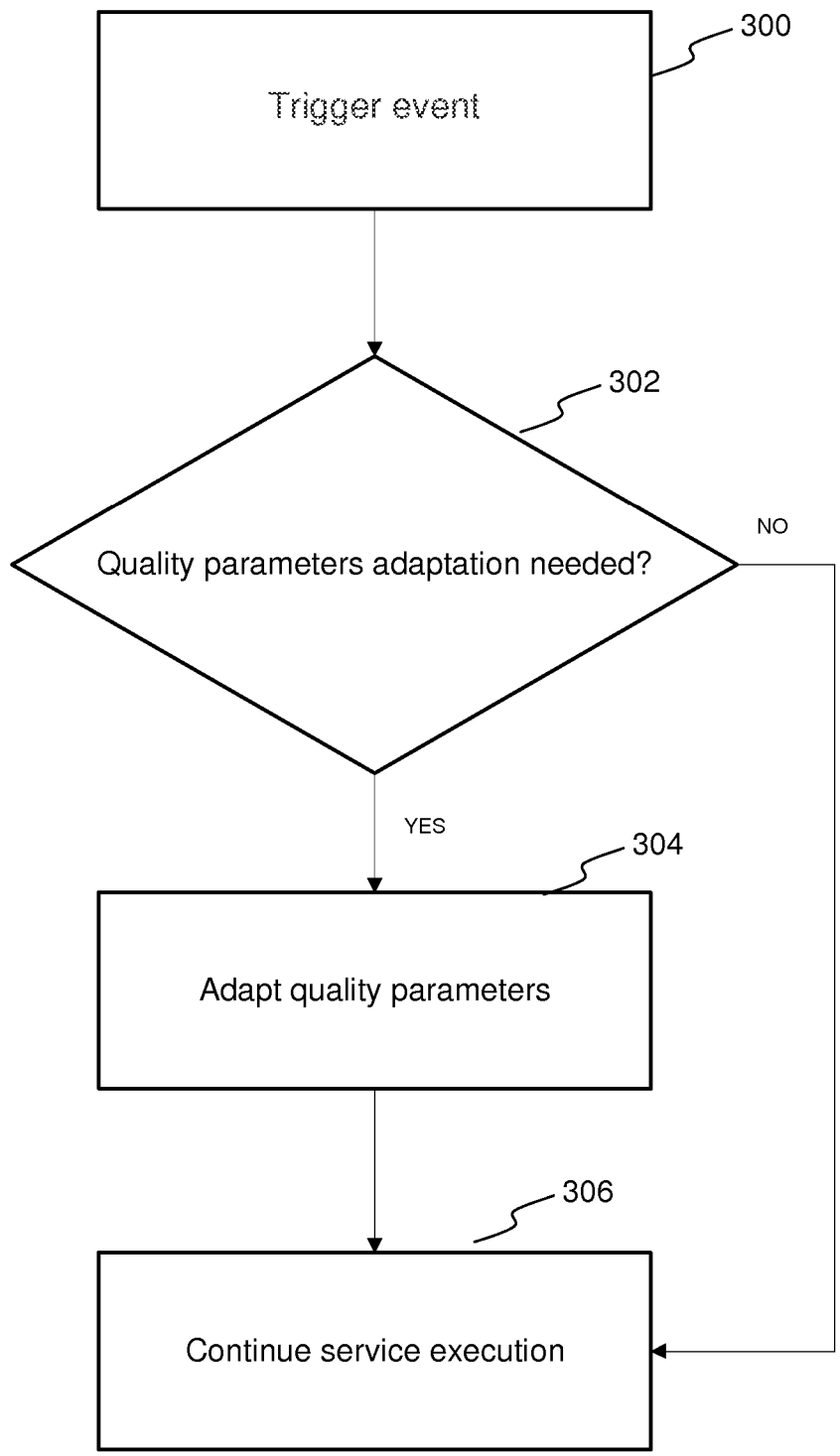
FIG. 3 shows a flow diagram of an embodiment of the proposed method.

FIG. 3 shows a flow diagram of an embodiment of the proposed method where the quality template mentioned above does not necessarily need to be static throughout the execution of the composite service. The parameters contained in the template may be changed dynamically in order to adapt to possible changes in the requested service quality. Such changes may be triggered by a trigger event, for example, in step 300, if throughout the execution of a composite service, as described in FIG. 2, the user accepts commercials. Then, in step 302 it is checked if the quality parameters need to be adapted in order to provide e.g. better video quality. If this is the case then in step 304 the quality parameters are adapted accordingly. Adaptation of the quality parameters can be achieved either by overwriting values of the already selected quality template, selecting a new template or generating a new template. The adaptation does not require the composite service execution to stop and so the service continues to be executed in step 306. If the quality parameters do not need to be adapted then again the service execution continues in step 306 without adaptation of the quality parameters.

Figure 4:
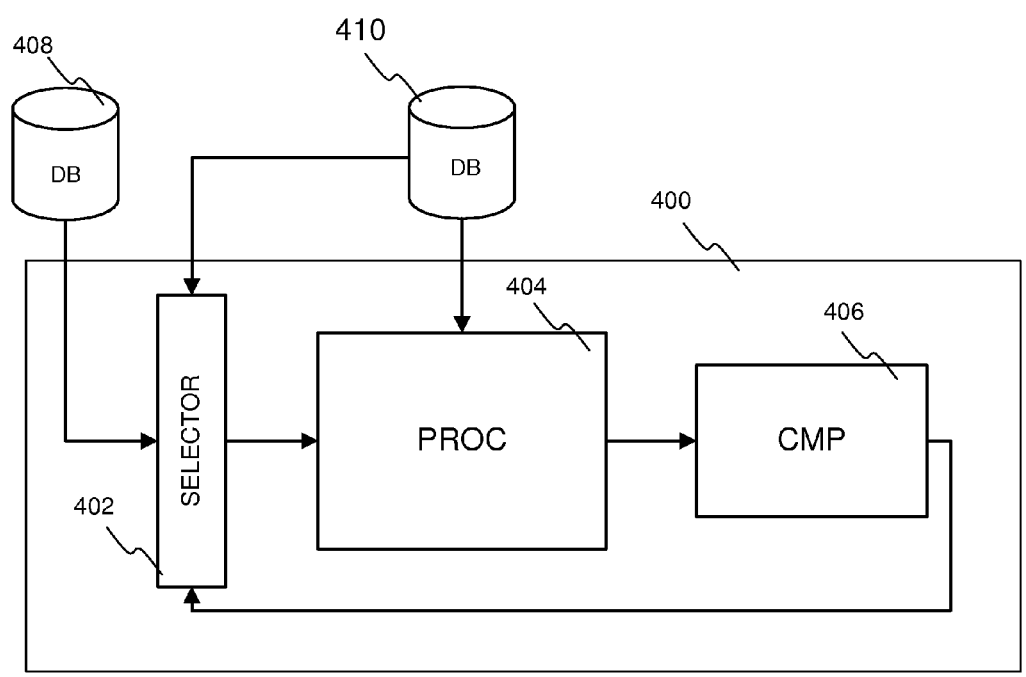
FIG. 4 shows a device which is adapted to perform the proposed method.

The invention can also be embodied in an application server 400 which can be adapted to perform any embodiments of the proposed method as described above. An embodiment of such an application server is shown in FIG. 4. The application server 400 comprises an interface 402 which is adapted to select constituent services from a service database 408. The selection can be made based on a composite service which has been started for a user in a telecommunication network out of a composite service database 410. The database 410 can alternatively include skeletons of composite services. Information about the composite service can be communicated to the interface and this information can influence the selection of the constituent service from database 408.

The application server further comprises a processor 404. The processor 404 is adapted to determine a group of quality settings based on the started composite service. These quality settings can be parameters of the composite service which are relevant for the QoS of this service. The processor 404 is further adapted to determine a group of quality parameters based on the constituent service selected by the interface 402. The description of the constituent service may include quality parameters that the service is able to handle. These quality parameters are identified by the processor 404 and determined as a separate group.

Further, the application server 400 comprises a comparator 406. The comparator 406 is adapted to compare the group of quality settings determined by the processor 404 with the group of quality parameters also determined by the processor 404. Depending on the content of these two groups there may be common parameters between them. These common parameters can be identified by the comparator 406 and they can be further communicated to the interface 402. The common parameters communicated by the comparator 406 to the interface 402 comprise requirements for the constituent service selected by the interface 402.

The application server 400 may comprise further elements e.g. elements shown in the composition engine of FIG. 1. Further the processor 404 and the comparator 406 can be implemented inside the analyzer 106 shown in FIG. 1.

The above embodiments admirably achieve the objects of the invention. However, it will be appreciated that departures can be made by those skilled in the art without departing from the scope of the invention which is limited only by the claims.

The invention claimed is:

1. A method for invoking a constituent service in a telecommunication network, wherein a plurality of constituent services are aggregated to create a composite service, the method comprising:
    determining a first group of parameters associated with the composite service,
    determining a second group of parameters associated with the constituent service, the second group of parameters relating to execution properties of the constituent service,
    comparing the first and the second group of parameters,
    when there are matching parameters in the first and the second group, determining input parameters for the constituent service based on the matching parameters in the first and the second group, and
    invoking the constituent service according to the matching parameters.

2. The method according to claim 1, wherein the constituent service is invoked after a start of the composite service.

3. The method according to claim 1, wherein the composite service comprises a plurality of constituent services.

4. The method according to claim 1, wherein the first group of parameters is determined based on a profile of a user.

5. The method according to claim 4, wherein the profile of the user indicates a subscription for access to the composite service.

6. The method according to claim 1, wherein matching parameters in the first and the second group are parameters of the same type.

7. The method according to claim 1, wherein a template comprises the first group of parameters and wherein the template contains information on the user and the composite service.

8. The method according to claim 7, wherein the template is generated after the start of the composite service.

9. The method according to claim 1, further comprising invoking the constituent service according to a default procedure when no matching parameters between the first and the second group of parameters are determined.

10. An application server for providing a composite service in a telecommunication network wherein a plurality of constituent services are aggregated to create the composite service, said application server comprising:
    a processor adapted to determine a first group of parameters based on the composite service and a second group of parameters based on a constituent service, the second group of parameters relating to execution properties of the constituent service,
    a comparator adapted to compare the first and the second group of parameters determined by the processor for identifying matching parameters in the two groups, wherein the matching parameters in the first and the second group determine input parameters for the constituent service, and
    a selector adapted to invoke the constituent service from a service database according to the matching parameters.

11. The application server according to claim 10, wherein constituent service is invoked after a start of the composite service.

12. The application server according to claim 10, wherein the composite service comprises a plurality of constituent services.

13. The application server according to claim 10, wherein the first group of parameters is determined based on a profile of a user.

14. The application server according to claim 13, wherein the profile of the user indicates a subscription for access to the composite service.

15. The application server according to claim 10, wherein matching parameters in the first and the second group are parameters of the same type.

16. The application server according to claim 10, wherein a template comprises the first group of parameters and wherein the template contains information on the user and the composite service.

17. The method according to claim 16, wherein the template is generated after the start of the composite service.

18. The method according to claim 10, further comprising invoking the constituent service according to a default procedure when no matching parameters between the first and the second group of parameters are determined.

19. A computer-readable medium that stores computer-executable process steps for invoking a constituent service in a telecommunication network herein a plurality of constituent services are aggregated to create a composite service, the computer-executable process steps comprising:
    determining a first group of parameters associated with the composite service, determining a second group of parameters associated with the constituent service, the second group of parameters relating to execution properties of the constituent service, comparing the first and the second group of parameters, when there are matching parameters in the first and the second group, determining input parameters for the constituent service based on the matching parameters in the first and the second group, and invoking the constituent service according to the matching parameters.

* * * * *

UNITED STATES PATENT AND TRADEMARK OFFICE
CERTIFICATE OF CORRECTION

PATENT NO. : 9,491,244 B2
APPLICATION NO. : 13/375903
DATED : November 8, 2016
INVENTOR(S) : Niemoeller et al.

Page 1 of 1

It is certified that error appears in the above-identified patent and that said Letters Patent is hereby corrected as shown below:

In the Specification

In Column 3, Line 67, delete "constituent 10" and insert -- constituent --, therefor.

In the Claims

In Column 8, Line 36, in Claim 11, delete "wherein" and insert -- wherein the --, therefor.

In Column 8, Line 55, in Claim 17, delete "method" and insert -- application server --, therefor.

In Column 8, Line 57, in Claim 18, delete "method" and insert -- application server --, therefor.

In Column 8, Line 63, in Claim 19, delete "herein" and insert -- wherein --, therefor.

Signed and Sealed this
Fifth Day of June, 2018

Andrei Iancu
*Director of the United States Patent and Trademark Office*